United States Patent
Ma

(10) Patent No.: US 9,835,788 B2
(45) Date of Patent: Dec. 5, 2017

(54) LIGHT GUIDE FILM OF MOBILE DEVICE AND MOBILE DEVICE

(71) Applicants: Hisense Mobile Communications Technology Co., Ltd., Qingdao, Shandong (CN); Hisense USA Corp., Suwanee, GA (US); Hisense International Co., Ltd., Qingdao, Shandong (CN)

(72) Inventor: Chengli Ma, Shandong (CN)

(73) Assignees: Hisense Mobile Communications Technology Co., Ltd., Qingdao (CN); Hisense USA Corp., Suwanee, GA (US); Hisense International Co., Ltd., Qingdao (CN)

(*) Notice: Subject to any disclaimer, the term of this patent is extended or adjusted under 35 U.S.C. 154(b) by 0 days.

(21) Appl. No.: 14/981,302

(22) Filed: Dec. 28, 2015

(65) Prior Publication Data

US 2016/0274291 A1 Sep. 22, 2016

(30) Foreign Application Priority Data

Mar. 20, 2015 (CN) .......................... 2015 1 0124160

(51) Int. Cl.
*F21V 8/00* (2006.01)
*G02F 1/1335* (2006.01)

(52) U.S. Cl.
CPC .......... *G02B 6/0058* (2013.01); *G02B 6/0045* (2013.01); *G02F 1/1336* (2013.01); *G02F 1/133602* (2013.01)

(58) Field of Classification Search
CPC .......... B29L 2031/3437; G02B 6/0011; G02B 6/0045; G02B 6/0058; G02B 6/006; G02B 6/0068; G02B 6/0073; G02B 6/0091; H01L 27/12; H04M 1/0202; H04M 1/0235; H04N 9/3197; H04N 9/3102; Y10S 362/80
See application file for complete search history.

(56) References Cited

U.S. PATENT DOCUMENTS 8,563,431 B2 * 10/2013 Miyairi ................. H01L 21/311
257/E21.476
9,130,109 B2 * 9/2015 Makimura ............ H01L 25/167
(Continued)

FOREIGN PATENT DOCUMENTS

CN 101097054 A 1/2008
CN 102472915 A 5/2012
(Continued)

OTHER PUBLICATIONS

First Chinese Office Action to Chinese Application No. 201510124160.1, dated Apr. 28, 2017 with English Translation (9p).

*Primary Examiner* — Hargobind S Sawhney
(74) *Attorney, Agent, or Firm* — Brinks Gilson & Lione

(57) ABSTRACT

A light guide film of a mobile device and a mobile device are provided. The light guide film includes a light insulation structure that divides the light guide film into different light guide regions. Each light guide region includes a light inlet configured to receive light from a light source. Different light guide regions correspond to light-transmitting symbols on the mobile device are configured to display different colors.

8 Claims, 3 Drawing Sheets

(56) References Cited

U.S. PATENT DOCUMENTS

| | | | | |
|---|---|---|---|---|
| 2001/0040802 A1* | 11/2001 | Shipman | ............... | H01H 13/70 |
| | | | | 362/227 |
| 2007/0285913 A1* | 12/2007 | Cybart | ................... | H04M 1/22 |
| | | | | 362/23.15 |
| 2008/0179172 A1* | 7/2008 | Sellers | .................. | H01H 13/83 |
| | | | | 200/314 |
| 2010/0020567 A1* | 1/2010 | Tatehata | ............... | G02B 6/0036 |
| | | | | 362/606 |
| 2010/0302132 A1* | 12/2010 | Ito | ..................... | G02F 1/133308 |
| | | | | 345/87 |
| 2012/0026418 A1* | 2/2012 | Tsuchida | ............ | G02B 27/2214 |
| | | | | 349/15 |
| 2013/0100698 A1* | 4/2013 | Ohara | .................... | G02B 6/005 |
| | | | | 362/608 |
| 2013/0250617 A1* | 9/2013 | Ahn | ..................... | G02B 6/0021 |
| | | | | 362/613 |
| 2014/0097071 A1* | 4/2014 | Park | ........................ | H04M 1/22 |
| | | | | 200/314 |

FOREIGN PATENT DOCUMENTS

| | | |
|---|---|---|
| CN | 102486275 A | 6/2012 |
| CN | 102749761 A | 10/2012 |

\* cited by examiner

LIGHT GUIDE FILM OF MOBILE DEVICE AND MOBILE DEVICE

CROSS-REFERENCE TO RELATED APPLICATION

This application claims priority to Chinese Patent Application No. 201510124160.1, filed on Mar. 20, 2015, which is hereby incorporated by reference in its entirety.

TECHNICAL FIELD

The present disclosure relates to the technical field of mobile devices, and in particular, to a light guide film of a mobile device and a mobile device.

BACKGROUND

Characters of portable electronic products such as mobile phones are often in different colors in order to attract users' attention, backlight of the characters varies accordingly, and the backlight is transmitted to positions of the characters through a light transferring pole or a light guide film.

In order to ensure that light crosstalk does not occur in the backlight of the characters in different colors, as shown in FIG. 1 and FIG. 2, FIG. 1 is a top view of a mobile device in the existing technology, FIG. 2 is a light guide film 3 used by light-transmitting symbols of the mobile device in the existing technology, as shown in FIG. 1, the mobile device 1 in the existing technology is provided thereon with a plurality of light-transmitting symbols 2, and the plurality of light-transmitting symbols 2 is in different colors, therefore, during light guide, different light guide films are needed, as shown in FIG. 2, in order to avoid that light crosstalk occurs in the light-transmitting symbols 2 in the mobile device 1, the existing technology uses a plurality of light guide films 3 to guide light. Light irradiated from an LED lamp 4 is incident upon the light guide films 3, and light crosstalk will not occur as the plurality of light guide films 3 has gaps therebetween.

Although such a manner can solve the problem of cross color of lamplight, as a plurality of light guide films 3 need to be used to adapt to indicators in different colors, during actual processing and production, it is necessary to increase multiple processes to position and align the light guide films, resulting in increase of the material cost and the production cost and reduction of the production efficiency.

SUMMARY

In one aspect, the present disclosure provides a light guide film of a mobile device. The light guide film includes at least one light insulation structure provided thereon, where the at least one light insulation structure divides the light guide film into different light guide regions. Each light guide region includes a light inlet configured to receive light from a light source. Different light guide regions correspond to light-transmitting symbols on the mobile device are configured to display different colors.

In another aspect, the present disclosure further provides a mobile device, the mobile device including the light guide film as described above.

BRIEF DESCRIPTION OF THE DRAWINGS

To illustrate the technical solutions in the embodiments of the present disclosure more clearly, the following briefly introduces the accompanying drawings required for describing the embodiments or the existing technology. Apparently, the accompanying drawings in the following description show merely some embodiments of the present disclosure, and a person of ordinary skill in the art may still derive other drawings from these accompanying drawings without creative efforts.

Figure 1:
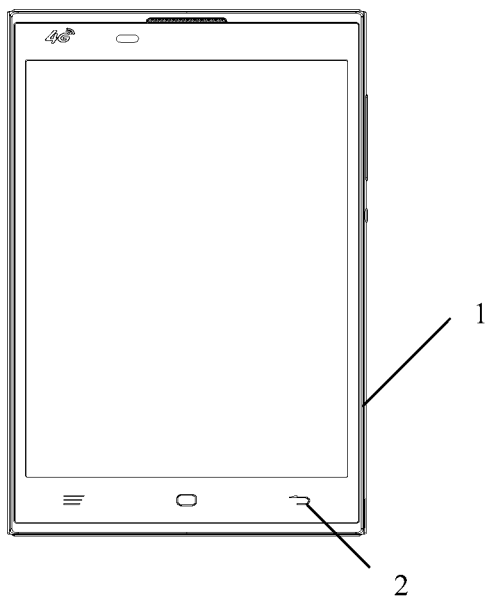
FIG. 1 is a mobile device in the existing technology.
Figure 2:
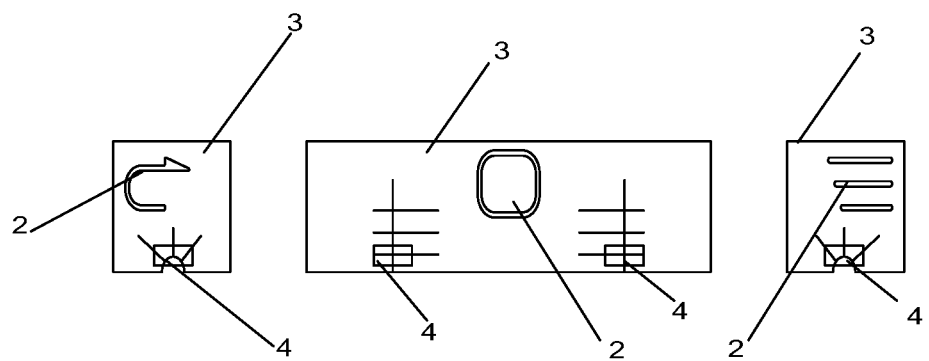
FIG. 2 is a light guide film in the mobile device in the existing technology.

| Reference signs: | | |
|---|---|---|
| 1-Mobile device | 2-Light-transmitting symbol | 3-Light guide film |
| 4-LED lamp | 10-Mobile device | 11-Battery cover |
| 12-First shell | 13-Second shell | 14-TP lens |
| 20-Light guide film | 21-Light insulation structure | 211-Light insulation member |
| 212-Door-shaped notch | 22-Light inlet. | |

DETAILED DESCRIPTION OF THE DRAWINGS

Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter include combinations of example embodiments in whole or in part.

In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

Various units, circuits, or other components may be described or claimed as "configured to" perform a task or tasks. In such contexts, "configured to" is used to connote structure by indicating that the units/circuits/components include structure (e.g., circuitry) that performs those task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. section 112, sixth paragraph, for that unit/circuit/component. Additionally, "configured to" can include generic structure (e.g., generic circuitry) that is manipulated by software and/or firmware (e.g., an FPGA or a general-purpose processor executing software) to operate in manner that is capable of performing the task(s) at issue.

The following clearly and completely describes the technical solutions in the embodiments of the present disclosure with reference to the accompanying drawings in the embodiments of the present disclosure. Apparently, the described embodiments are some of the embodiments of the present disclosure rather than all of the embodiments. All other embodiments obtained by a person of ordinary skill in the art based on the embodiments of the present disclosure without creative efforts shall fall within the protection scope of the present disclosure.

In the description of the present disclosure, it should be understand that positions and positional relationships indicated by the terms such as "center", "above", "below", "in front of", "behind", "left", "right", "vertical", "horizontal", "top", "bottom", "inside", "outside" are based on the position or positional relationship shown in the accompany drawings, which are used only for convenient and brief description, and do not indicate or imply that the indicated apparatus or element must be in a specific position, and must be constructed and operated in a specific position. In addition, in embodiments of the present disclosure, an inner end and an outer end are both defined according to directions of signals in a transmission path, that is, according to directions of signals in a transmission path, one end for inputting signals is defined as the outer end or a signal input end of the transmission path, and another end for outputting signals is defined as the inner end or a signal output end. Of course, other names may be defined according to principles, and thus the foregoing cannot be understood as a limitation on the present disclosure.

In order to make the objectives, technical solutions and advantages of the present disclosure much clearer, the present utility model is further described below in detail by taking non-restrictive embodiments as an example.

Figure 4:
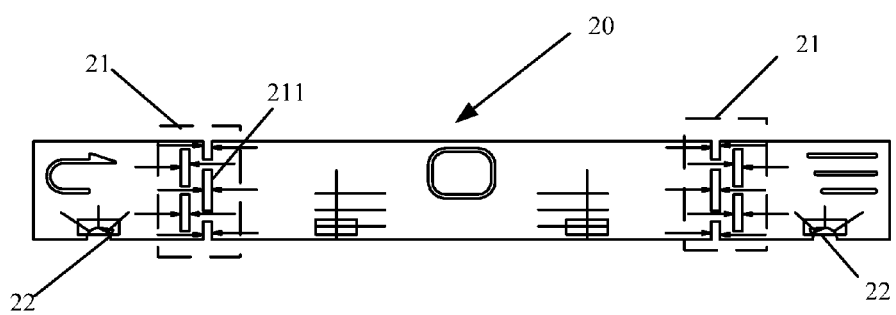
FIG. 4 is another schematic structural view of the light guide film according to embodiments of the present disclosure.

As shown in FIG. 4, FIG. 4 is a schematic structural view of a light guide film according to one embodiment of the present disclosure.

The embodiment of the present disclosure provides a light guide film of a mobile device, the light guide film 20 includes at least one light insulation structure 21 provided thereon, where the at least one light insulation structure 21 divides the light guide film 20 into different light guide regions. Each light guide region includes a light inlet 22, which may be configured to receive light from a light source. Different light guide regions correspond to light-transmitting symbols on the mobile device 10 are configured to display different colors.

In the embodiment, as shown in FIG. 4, the light guide film 20 is provided thereon with a plurality of light insulation structures 21, so as to divide the light guide film 20 into different light guide regions, wherein the light guide regions correspond to light-transmitting symbols on the mobile device 10, light incident from the light inlet 22 in each light guide region is propagated in the light guide region and is finally transmitted to the light-transmitting symbol corresponding to the light guide region, when light in different colors is incident upon the light guide film 20, through the light insulation structures 21 disposed on the light guide film 20, the light incident upon each light guide region is blocked by the light insulation structures 21, and the light can only be propagated in the light guide region and is propagated to the light-transmitting symbol corresponding to the light guide region. It can be seen through the foregoing description that, by use of the light guide film 20 in this embodiment, light guide on light-transmitting symbols on the mobile device 10 which display light in different colors can be achieved only with one light guide film 20, and compared with the existing technology, light guide on all the light-transmitting symbols can be achieved with one light guide film 20, thus reducing the number of the light guide film 20 used, reducing positioning members during assembly of the light guide film 20, facilitating installation of the light guide film 20, reducing the production cost of the mobile device 10, and improving the production efficiency of the mobile device 10.

In the foregoing embodiment, the light insulation structures 21 of the light guide film 20 divide the light guide film 20 into a plurality of light guide regions, adjacent guide regions correspond to light-transmitting symbols on the mobile device 10 which are in different colors, therefore, during specific setting, the light guide regions can be determined according to actual situations, as shown in FIG. 4, FIG. 4 illustrates that three light-transmitting symbols are used, and along a setting direction thereof, the three light-transmitting symbols are respectively white, red and white. Therefore, the light guide film 20 used is divided into three light guide regions through two light insulation structures 21, and the three light guide regions respectively one-to-one correspond to the three light-transmitting symbols. Certainly, it should be understood that, the light guide film 20 in this embodiment is not merely limited to the structure of the light guide film 20 shown in FIG. 4, the number of the set light insulation structures 21 may be four, five or the like, and specific setting thereof is determined according to the light-transmitting symbols on the mobile device 10. However, in order to understand this embodiment, the light insulation structures 21 and the light guide regions of the light guide film 20 are described below in detail by taking the light guide film 20 shown in FIG. 4 which has two light insulation structures 21 and three light guide regions as an example.

In the foregoing embodiment, the light insulation structures 21 of the light guide film 20 may use a different structure to divide the light guide film 20 into different light guide regions, and the light insulation structures 21 are described below in detail with a specific embodiment.

Figure 5:
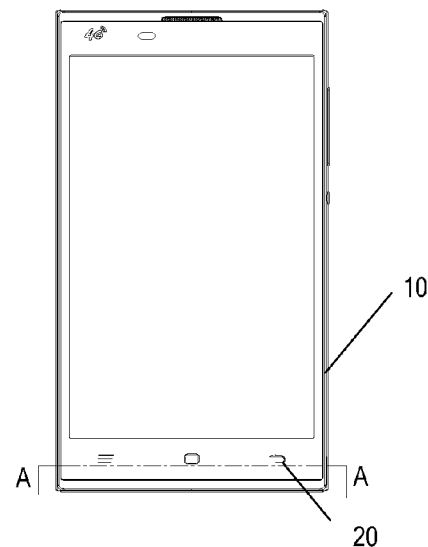
FIG. 5 is a schematic structural view of a mobile device where the light guide film in this embodiment is applied.
Figure 6:
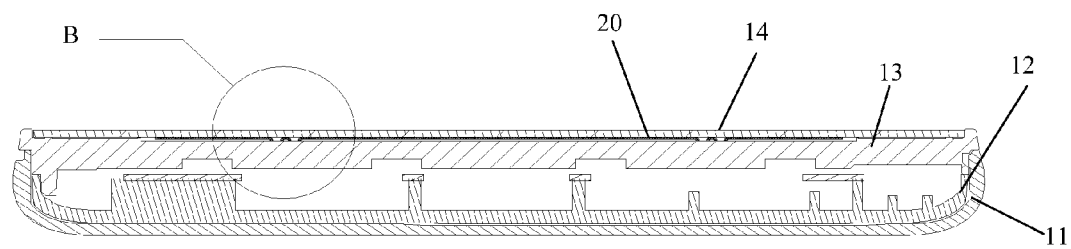
FIG. 6 is a sectional view of A-A in FIG. 5.

First, in order to facilitate understanding of use of the light guide film 20 in this embodiment, application of the light guide film 20 in this embodiment is described below with reference to FIG. 5 and FIG. 6. FIG. 5 illustrates a mobile device 10 where the light guide film 20 in this embodiment is applied, and FIG. 6 is a partial sectional view of A-A in FIG. 5. The placement direction of the mobile device 10 shown in FIG. 6 is taken as a reference direction. The mobile device 10 includes a battery cover 11, a first shell disposed in the battery cover 11, a second shell 13 covering the first shell 12, a light guide film 20 disposed above the second shell 13, and a TP lens 14 disposed above the light guide film 20.

Embodiment 1

Figure 7:
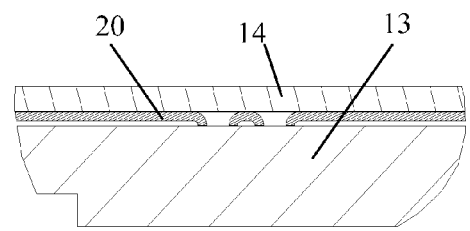
FIG. 7 is a partial enlarged view of B in FIG. 6.

Referring to FIG. 4, in combination with FIG. 5, FIG. 6 and FIG. 7, FIG. 4 is a schematic view after the light guide film 20 in this embodiment is assembled with a TP film, FIG. 5 illustrates a mobile device 10 where the light guide film 20 in this embodiment is applied, FIG. 6 is a sectional view of A-A in FIG. 5, and FIG. 7 is a partial enlarged view of B in FIG. 6.

In this embodiment, the light insulation structures 21 of the light guide film 20 are a plurality of light insulation members 211, the plurality of light insulation members 211 is arranged into at least two columns, and the light insulation members 211 each have a bending structure that guides the light to an enclosure of the mobile device 10. The number of the columns of the light insulation members 211 may be set according to actual requirements. As a preferred solution, as shown in FIG. 4, each light insulation structure 21 includes two columns of light insulation members 211, the plurality of light insulation members is arranged into two columns, and the two columns of light insulation members are staggered to cause one column of light insulation members to isolate light passing through gaps between the other column of light insulation members. That is, a gap between any two light insulation members 211 in one column of light insulation members 211 corresponds to one light insulation member 211 in the other column of light insulation members 211, so that two light guide regions divided by the light insulation structure 21 can be isolated from each other. Light irradiated from an LED lamp is incident upon the light guide regions of the light guide film 20 from the light inlet 22, when the light is propagated to edges of the light guide regions, one side where the light insulation structure 21 is disposed is as the situation shown in FIG. 4, the light (straight lines with arrows) is blocked by the light insulation members 211, and cannot be incident upon adjacent light guide regions. Moreover, when two columns of light insulation members 211 which are staggered are used, as shown in FIG. 4, for one light guide region, when light propagated passes through gaps between the light insulation members 211 in the first column of light insulation members 211, the light is blocked by the light insulation members 211 in the second column of light insulation members 211, thus improving light insulation effects of the adjacent light guide regions.

It should be understood that, the number of columns of the light insulation members 211 in the light insulation structure 21 can be determined according to actual requirements, for example, three columns, four columns or other different columns. The shape of the light insulation members 211 may also be determined according to actual requirements, but is not merely limited to the elongated holes shown in FIG. 4, and circular holes, oval holes or holes in other different shapes may also be used. In the light insulation members 211 in different shapes, in order to ensure the light insulation effects thereof, their width (a distance along the length direction of the light guide film 20) should meet requirements, specifically, the width is greater than or equal to 1.5 mm. preferably, the shape of the light insulation members 211 is elongated holes, and the number of each column of light insulation members 211 is 2-3, so as to facilitate setting of the light insulation members 211; moreover, a spacing distance between the light insulation members 211 may be a certain distance, so as to ensure connection strength of the light guide film 20 at the light insulation structure 21, thereby improving strength of the whole light guide film 20. As shown in FIG. 4, when the elongated holes are set and the light insulation members 211 are disposed at edges of the light guide film 20, the light insulation members 211 located at two ends of each column of light insulation members 211 are cut into half holes by the light guide film 20, to form a notch shape, so as to ensure that the light will not pass through an end portion of the light insulation structure 21; it should be understood that at least two light insulation members 211 of the light insulation members 211 in the two columns of light insulation members 211 form the notch shape on two opposite sides of the light guide film 20, so as to ensure the light insulation effects.

In addition, when two columns of light insulation members 211 of each light insulation structure 21 are set, they may be arranged along different directions, as long as the light guide film 20 can be divided into different light guide regions, for example, two columns of light insulation members 211 are arranged in a figure-eight pattern, arranged in parallel into two columns and form an acute angle or obtuse angle with the long side of the light guide film 20; preferably, as shown in FIG. 4, the two columns of light insulation members 211 are arranged in a direction perpendicular to the long side of the light guide film 20, that is, an arrangement direction of a plurality of light insulation members 211 is perpendicular to a length direction of the light guide film 20, so as to facilitate setting of the light insulation members 211.

In order to ensure light insulation effects of the light insulation structure 21, side walls of the light insulation structure 21 have a bending structure that guides the light to an enclosure of the mobile device. When the light is propagated to the position of a light insulation member 211, the propagation direction is changed along a bending direction of the light insulation member 211, to cause the light to be irradiated from the bending structure, the light is directly irradiated to the second shell 13, and is absorbed by the black second shell 13, thereby further improving the light insulation effects. Moreover, after use of the bending structure, the width size of the light insulation member 211 may be further reduced, so as to avoid effects of too much bending of light-controlled width on the structural strength of the light guide film 20. As a preferred solution, preferably, the bending structure is a curved bending structure. As shown in FIG. 6, when a curved bending structure is used, the light produces more reflection on the side walls of the curved bending structure, to avoid that the light is shot out on the side walls of the bending structure, thereby improving the light insulation effects.

In addition, for the light inlet 22, in the foregoing embodiment, the structure of the light inlet 22 may be a different structure, for example, a curved light inlet, as shown in FIG. 4, in the light guide film 20 shown in FIG. 4, the light inlets 22 of the light guide regions on two sides are curved light inlets 22, and for the light guide regions, the number of the light inlets 22 may be determined according to the size of the actual light guide regions. When larger light guide regions are used, the number of the light inlets 22 may be set as more as required.

It can be seen from the description about the embodiment that using light insulation members 211 as light insulation structures 21 can divide the whole light guide film 20 into different light guide regions, so that one light guide film 20 can achieve light guide effects on light-transmitting symbols in different colors, thus reducing the number of the light guide film 20; meanwhile, when one light guide film 20 is used, the mobile device 10 only needs a structure that positions and fixes the light guide film 20, which, compared with the existing technology, reduces the structure that positions and fixes the light guide film 20, simplifies complexity of the shell of the mobile device 10, improves production efficiency of the mobile device 10, and reduces the production cost of the whole mobile device 10.

Embodiment 2

Figure 3:
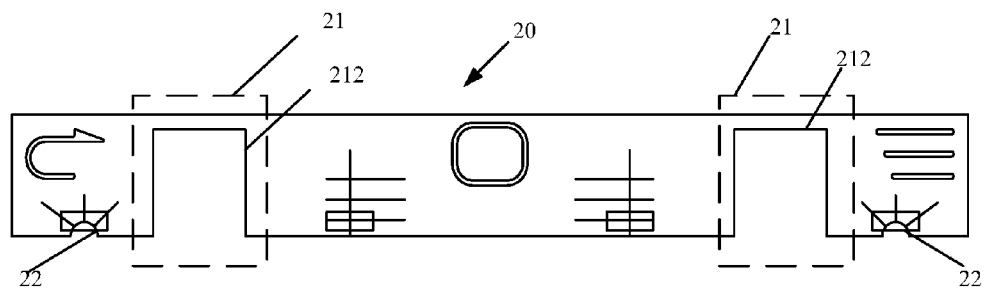
FIG. 3 is a schematic structural view of a light guide film according to embodiments of the present disclosure.

As shown in FIG. 3, FIG. 3 illustrates another light insulation structure 21 of the light guide film 20 in this embodiment, in the light insulation structure 21 in this embodiment, the light insulation structure 21 is a notch disposed on the light guide film 20; the light guide film 20 is divided into a plurality of light guide regions through the notch. When light is incident upon the light guide film 20, the light is blocked by the notch, thus avoiding that the light is propagated from one light guide region to another light guide region and avoiding occurrence of light crosstalk, when the light insulation structure 21 in this embodiment is used, the size of the notch should ensure that the notch can block the light from shining in positions of corresponding light-transmitting symbols in adjacent light guide regions, and should ensure connection strength between the light guide film 20, so that the light guide film 20 can form an integral structure.

Specifically, the notch is a door-shaped notch 212. By use of the door-shaped structure, the whole light insulation structure 21 is simpler and is easier to set, thus facilitating processing of the light guide film 20, meanwhile, as shown in FIG. 3, the door-shaped notch 212 causes a connecting portion between two light guide regions of the light guide film 20 to be weaker, but the width (a distance perpendicular to the length direction of the light guide film 20) of the connecting portion should not only connect the two light guide regions but also avoid that the light propagated through the connecting portion enters into positions of corresponding light-transmitting symbols of the light guide regions; preferably, the width of the connecting portion is 1 mm, and the width of the door-shaped structure is 4 mm. The number of the notch is two, it should be understood that, the light insulation structures 21 of the two door-shaped structure in this embodiment merely corresponding to the light guide film 20 having light-transmitting symbols in three different colors, and when the number of the light-transmitting symbols in different colors increases, the light insulation structures 21 on the light guide film 20 also affect the corresponding increase.

In addition, for the light inlet 22, in the foregoing embodiment, the structure of the light inlet 22 may be a different structure, for example, a curved light inlet 22, a rectangular light inlet 22 and other light inlets 22 in different shapes, as shown in FIG. 3, in the light guide film 20 shown in FIG. 3, the light inlets 22 of the light guide regions located on two sides are curved light inlets 22, the light inlets 22 of the light guide regions located in the middle are rectangular light inlets 22, and for the light guide regions in the middle, two light inlets 22 are used, but the number of the light inlets 22 may be determined according to the size of the actual light guide regions. When larger light guide regions are used, the number of the light inlets 22 may be set as more as required.

It can be seen from the description about the embodiment that using notches as light insulation structures 21 can divide the whole light guide film 20 into different light guide regions, so that one light guide film 20 can achieve light guide effects on light-transmitting symbols in different colors, thus reducing the number of the light guide film 20; meanwhile, when one light guide film 20 is used, the mobile device 10 only needs a structure that positions and fixes the light guide film 20, which, compared with the existing technology, reduces the structure that positions and fixes the light guide film 20, simplifies complexity of the shell of the mobile device 10, improves production efficiency of the mobile device 10, and reduces the production cost of the whole mobile device 10; in addition, for the light insulation structures 21 in this embodiment, the light insulation structures 21 are simpler, thus facilitating the making of the light guide film 20.

It can be seen from the light insulation structures 21 given in the specific embodiment 1 and embodiment 2 that the light guide film 20 in this embodiment can be divided into different light guide regions through different light insulation structures 21, so that one light guide film 20 can perform light guide on light-transmitting symbols in different colors. However, it should be noted that, the specific embodiment 1 and embodiment 2 merely give specific embodiments of two light insulation structures 21, the light insulation structures 21 of the light guide film 20 in this embodiment are not merely limited to the notch and the structure of the light insulation members given in the specific embodiments, any other similar structures can be applied to the light guide film 20 in this embodiment, and the principles thereof are similar to those of the structures given in the specific embodiment 1 and embodiment 2, which are not repeated herein one by one.

As shown in FIG. 5, one embodiment of the present disclosure further provides a mobile device 10, wherein the mobile device 10 includes the light guide film 20 as described above.

In the foregoing embodiment, the mobile device 10 may be a mobile devices 10 such as mobile phones, a tablet, and a notebook, wherein the mobile device 10 uses the structure of the light guide film 20 in the foregoing embodiment, the light guide film 20 uses light insulation structures 21 to divide the whole light guide film 20 into different light guider regions, so that one light guide film 20 can achieve light guide effects on light-transmitting symbols in different colors, thus reducing the number of the light guide film 20, meanwhile, when one light guide film 20 is used, the mobile device 10 only needs a structure that positions and fixes the light guide film 20, which, compared with the existing technology, reduces the structure that positions and fixes the light guide film 20, simplifies complexity of the shell of the mobile device 10, improves production efficiency of the mobile device 10, and reduces the production cost of the whole mobile device 10.

Beneficial effects of the present disclosure are as follows: the light guide film uses a light insulation structure to divide the whole light guide film into different light guide regions, so that one light guide film achieves light guide effects on light-transmitting symbols in different colors, thus reducing the number of the light guide film. Meanwhile, when one light guide film is used, the mobile device only needs a structure that positions and fixes the light guide film. Compared with the existing technology, the light guide film reduces the structure that positions and fixes the light guide film, simplifies complexity of the shell of the mobile device, improves production efficiency of the mobile device, and reduces the production cost of the whole mobile device.

Evidently, a person skilled in the art can make various variations and modifications to the present disclosure without departing from the spirit and scope of the present disclosure. In this way, if such variations and modifications to the present disclosure fall within the scope of the claims of the present disclosure and equivalent technologies thereof, the present disclosure intends to include such variations and modifications.

What is claimed is:

1. A light guide film of a mobile device, comprising:
at least one light insulation structure in the light guide film;
at least two light guide regions in the light guide film comprising a first light guide region and a second light region, wherein:
the at least one light insulation structure divides the light guide film into the at least two light guide regions, and
each of the at least two light guide regions comprises at least one light inlet configured to receive light from at least one light source; and
wherein:
each of the at least one light insulation structure comprises a plurality of light insulation members; the plurality of light insulation members are arranged into at least two columns, and the at least two columns of the light insulation members are staggered to cause one column of the light insulation members to block the light passing through gaps between another column of the light insulation members; and
each of the light insulation members comprises:
a hole at a center of each of the light insulation members,
a bended structure around the hole, wherein the bended structure is configured to guide the light to an enclosure of the mobile device.

2. The light guide film according to claim 1, wherein:
an arrangement direction of the light insulation members in each column of the light insulation members is perpendicular to a direction along a length of the light guide film.

3. The light guide film according to claim 1, wherein the bended structure comprises a curved bended structure.

4. The light guide film according to claim 1, wherein when light in the first light guide region propagates to the at least one light insulation structure between the first light guide region and the second light guide region, the light is substantially blocked by the light insulation structure and cannot propagate into the second light guide region.

5. A mobile device, comprising:
a light guide film comprising:
at least one light insulation structure in the light guide film;
at least two light guide regions in the light guide film comprising a first light guide region and a second light guide region, wherein:
the at least one light insulation structure divides the light guide film into the at least two light guide regions, and
each of the at least two light guide regions comprises at least one light inlet configured to receive light from at least one light source; and
wherein:
each of the at least one light insulation structure comprises a plurality of light insulation members; the plurality of light insulation members are arranged into at least two columns, and the at least two columns of the light insulation members are staggered to cause one column of the light insulation members to block the light passing through gaps between another column of the light insulation members; and
each of the light insulation members comprises:
a hole at a center of each of the light insulation member,
a bended structure around the hole, wherein the bended structure is configured to guide the light to an enclosure of the mobile device.

6. The mobile device according to claim 5, wherein:
an arrangement direction of the light insulation members in each column of the light insulation members is perpendicular to a direction along a length of the light guide film.

7. The mobile device according to claim 5, wherein the bended structure comprises a curved bended structure.

8. The mobile device according to claim 5, wherein when light in the first light guide region propagates to the at least one light insulation structure between the first light guide region and the second light guide region, the light is substantially blocked by the light insulation structure and cannot propagate into the second light guide region.

* * * * *